US011606060B2

(12) United States Patent
Reynolds et al.

(10) Patent No.: US 11,606,060 B2
(45) Date of Patent: Mar. 14, 2023

(54) LOCKING DEVICE, PHOTOVOLTAIC MODULE MOUNTING STRUCTURE, AND PHOTOVOLTAIC SYSTEM

(71) Applicants: CSI SOLAR POWER GROUP CO., LTD., Suzhou (CN); Canadian Solar Manufacturing (Changshu) Inc., Suzhou (CN)

(72) Inventors: Charles Jonathan Reynolds, Suzhou (CN); George Kuo, Suzhou (CN); Jean-Nicolas Jaubert, Suzhou (CN); Yangdong Ni, Suzhou (CN); Yuanjie Yu, Suzhou (CN)

(73) Assignees: CSI SOLAR POWER GROUP CO., LTD., Suzhou (CN); CANADIAN SOLAR MANUFACTURING (CHANGSHU) INC., Suzhou (CN)

( * ) Notice: Subject to any disclaimer, the term of this patent is extended or adjusted under 35 U.S.C. 154(b) by 23 days.

(21) Appl. No.: 17/478,989

(22) Filed: Sep. 20, 2021

(65) Prior Publication Data

US 2022/0209712 A1    Jun. 30, 2022

(30) Foreign Application Priority Data

Dec. 29, 2020    (CN) .......................... 202011593549.8

(51) Int. Cl.
*H02S 30/10*    (2014.01)

(52) U.S. Cl.
CPC .................................... *H02S 30/10* (2014.12)

(58) Field of Classification Search
CPC ....................................................... H02S 30/10
See application file for complete search history.

(56) References Cited

U.S. PATENT DOCUMENTS

| | | | | |
|---|---|---|---|---|
| 2014/0294493 | A1* | 10/2014 | Cavieres | F24S 25/632 403/327 |
| 2016/0365827 | A1* | 12/2016 | Au | H02S 20/32 |
| 2020/0132339 | A1* | 4/2020 | Truthseeker | F24S 25/33 |

* cited by examiner

*Primary Examiner* — Jayne L Mershon
(74) *Attorney, Agent, or Firm* — Schmeiser, Olsen & Watts, LLP (57) ABSTRACT

Provided are a locking device, a photovoltaic module mounting structure and a photovoltaic system. The locking device includes a blocking portion, a plug portion, and a guide portion. The blocking portion protrudes from the guide rail and is provided with a clamping groove for clamping a frame of the solar module. The plug portion is connected to the blocking portion, and the plug portion is configured to be in plug-in fit with the guide rail. The guide portion is connected to the blocking portion and provided with a guide ramp, one end of the guide ramp is flush with a notch of the clamping groove, and the other end of the guide ramp extends obliquely downward along a length direction of the guide rail.

20 Claims, 4 Drawing Sheets

LOCKING DEVICE, PHOTOVOLTAIC MODULE MOUNTING STRUCTURE, AND PHOTOVOLTAIC SYSTEM

CROSS-REFERENCE TO RELATED APPLICATION

This application claims priority to Chinese Patent Application No. 202011593549.8, having a filing date of Dec. 29, 2020, the entire contents of which are hereby incorporated by reference.

FIELD OF TECHNOLOGY

The following belongs to the field of photovoltaic technologies, and in particular, to a locking device, a photovoltaic module mounting structure and a photovoltaic system.

BACKGROUND

A photovoltaic module is the core part of a solar power system and is also the most important part of the solar power system. The photovoltaic module includes a lamination and a frame of the solar module, and the frame of the photovoltaic module is configured to encapsulate and protect peripheries of the lamination. The frame of the photovoltaic module is fixed to a guide rail, and the guide rail can protect the solar module.

In the conventional art, the frame of the photovoltaic module is connected to a photovoltaic guide rail through locking devices such as bolts or mounting clips. Bolted connection requires a large number of fasteners and mounting tools thereof, and the mounting clips need to be hammered onto a module flange, which is likely to cause damage to the solar module. An existing mounting structure increases the installation labor for the solar module, reduces the installation efficiency and increases the installation cost.

SUMMARY

An aspect relates to a locking device to reduce the installation labor and the installation cost of a photovoltaic system and improve the installation efficiency and the installation quality of the photovoltaic system.

To achieve the aspect, the present disclosure adopts technical solutions described below.

A locking device for fixing a photovoltaic module to a guide rail includes a blocking portion, a plug portion, and a guide portion.

The blocking portion protrudes from the guide rail and is provided with a clamping groove for clamping a frame of the solar module.

The plug portion is connected to the blocking portion, and the plug portion is configured to be in plug-in fit with the guide rail.

The guide portion is connected to the blocking portion and provided with a guide ramp, one end of the guide ramp is flush with a notch of the clamping groove, and the other end of the guide ramp extends obliquely downward along a length direction of the guide rail.

In an exemplary embodiment, the blocking portion includes a bearing plate, a first limiting portion, and a second limiting portion.

The bearing plate is configured to support the frame.

The first limiting portion and the second limiting portion are both disposed on the bearing plate and disposed at intervals along the length direction of the guide rail, the clamping groove is formed between the first limiting portion and the second limiting portion, and the guide portion is connected to the second limiting portion.

In an exemplary embodiment, the first limiting portion and the second limiting portion are disposed at intervals along a width direction of the guide rail.

In an exemplary embodiment, the first limiting portion is U-shaped and includes a top plate and two side plates which are respectively connected to the top plate and disposed opposite to each other, one of the two side plates is connected to the bearing plate, and at least one of the two side plates is provided with the plug portion.

In an exemplary embodiment, a plurality of plug portions are disposed on the two side plates, in response to a plug portion of the plurality of plug portions disposed on one of the two side plates being in plug-in fit with the guide rail, a plug portion of the plurality of plug portions disposed on the other one of the two side plates abuts against the guide rail.

In an exemplary embodiment, the plurality of plug portions disposed on the two side plates are staggered along a width direction of the guide rail.

In an exemplary embodiment, the plug portion is an inserting plate, and the guide rail is provided with a mounting hole mated with the inserting plate.

In an exemplary embodiment, the inserting plate is provided with an elastic piece, the guide rail is provided with a fixing hole mated with the elastic piece, and in response to the inserting plate being inserted into a corresponding mounting hole, the elastic piece is snapped into a corresponding fixing hole.

In an exemplary embodiment, the bearing plate is provided with a separation channel extending along the length direction of the guide rail and penetrating through an end face of the bearing plate facing toward the second limiting portion, and the separation channel is disposed between the first limiting portion and the second limiting portion.

In an exemplary embodiment, the locking device further includes a piercing portion, the piercing portion is connected to the blocking portion, and the piercing portion is configured to pierce a protective layer of the frame and abut against the frame in response to the frame being slidably fitted into the clamping groove.

In an exemplary embodiment, the piercing portion includes an inclined plate, the inclined plate is disposed on the bearing plate and disposed obliquely from bottom to top along the length direction of the guide rail, a top end of the inclined plate is provided with a sharp protrusion, and the sharp protrusion abuts against the frame.

In an exemplary embodiment, at least one of the first limiting portion or the second limiting portion is provided with a sharp protrusion.

The present disclosure provides a photovoltaic module mounting structure to reduce the installation labor and the installation cost of a photovoltaic system and improve the installation efficiency and the installation quality of the photovoltaic system.

To achieve the aspect, the present disclosure adopts technical solutions described below.

A photovoltaic module mounting structure includes a guide rail and the above-mentioned locking device.

The present disclosure provides a photovoltaic system to reduce the installation labor and the installation cost of the photovoltaic system and improve the installation efficiency and the installation quality of the photovoltaic system.

To achieve the aspect, the present disclosure adopts technical solutions described below.

A photovoltaic system includes a photovoltaic module and further includes the above-mentioned photovoltaic module mounting structure.

BRIEF DESCRIPTION

Some of the embodiments will be described in detail, with reference to the following figures, wherein like designations denote like members, wherein.

REFERENCE LIST 10 guide rail
101 mounting hole
102 fixing hole
20 locking device
30 frame
301 first frame body
302 second frame body
40 bracket
1 blocking portion
11 bearing plate
111 separation channel
12 first limiting portion
121 top plate
122 side plate
13 second limiting portion
2 plug portion
21 elastic piece
3 guide portion
4 piercing portion

DETAILED DESCRIPTION

To make solved problems, adopted solutions and achieved effects of the present disclosure clearer, the technical solutions of the present disclosure are further described through embodiments in conjunction with drawings. It is to be understood that the embodiments described herein are merely intended to illustrate and not to limit the present disclosure. Additionally, it is to be noted that for ease of description, only a portion, not all, related to the present disclosure is illustrated in the drawings.

In the description of the present disclosure, unless otherwise expressly specified and limited, terms "connected to each other", "connected" or "fixed" are to be construed in a broad sense, for example, as permanently connected, detachably connected, or integrated; mechanically connected or electrically connected; directly connected to each other or indirectly connected to each other via an intermediary; or internally connected or interactional between two components. For those of ordinary skill in the art, specific meanings of the above terms in the present disclosure may be understood based on specific circumstances.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the embodiment, the orientation or position relationships indicated by terms "above", "below", "right" and the like are based on the orientation or position relationships shown in the drawings, merely for facilitating description and simplifying operation, and these relationships do not indicate or imply that the referred device or element has a specific orientation and is constructed and operated in a specific orientation, and thus it is not to be construed as limiting the present disclosure. In addition, the terms "first" and "second" are merely used for descriptive purposes and have no special meanings.

The technical solutions of the present disclosure will be further described below through embodiments in conjunction with the drawings.

Embodiment One

Figure 1:
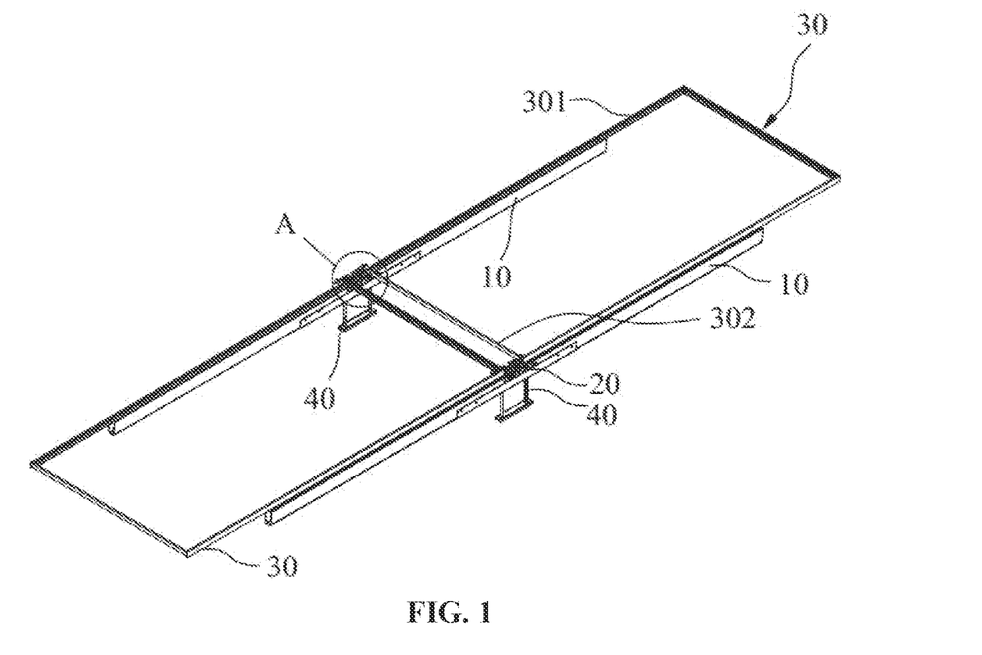
FIG. 1 is a schematic assembly view of a photovoltaic system without a lamination mounted according to embodiment one of present disclosure.

As shown in FIG. 1, this embodiment provides a photovoltaic system. The photovoltaic system includes a solar module, a bracket 40, and a photovoltaic module mounting structure. The photovoltaic module includes a lamination (not shown in the figure) and a frame 30, and the lamination is disposed within the frame 30. A guide rail 10 is disposed on the bracket 40, and the frame 30 is mounted on the bracket 40 through the photovoltaic module mounting structure.

The lamination of this embodiment has a rectangular structure and includes a front plate, a rear plate, and a string of battery cells disposed between the front plate and the rear plate. The front plate, the string of battery cells and the rear plate are laminated by a laminating machine to form the lamination.

The frame 30 is a rectangular frame structure and is configured to encapsulate and protect peripheral edges of the lamination to avoid damage to the lamination. Specifically, the frame 30 includes two first frame bodies 301 disposed opposite to each other and two second frame bodies 302 disposed opposite to each other, and the first frame bodies 301 and the second frame bodies 302 are sleeved on edges of respective sides of the lamination to encapsulate and protect the lamination, thereby increasing the compressive ability of the photovoltaic module and prolonging the service life of the solar module.

End portions of the first frame bodies 301 are docked with end portions of the second frame bodies 302 such that the first frame bodies 301 and the second frame bodies 302 are spliced into a whole and fixed to the lamination. In order to improve the docking effect of the first frame bodies 301 and the second frame bodies 302, docking end faces of the first frame bodies 301 and the second frame bodies 302 may be ramps mated with each other. In this manner, a contact area between the first frame bodies 301 and the second frame bodies 302 is increased, and good splicing effect is achieved.

Figure 2:
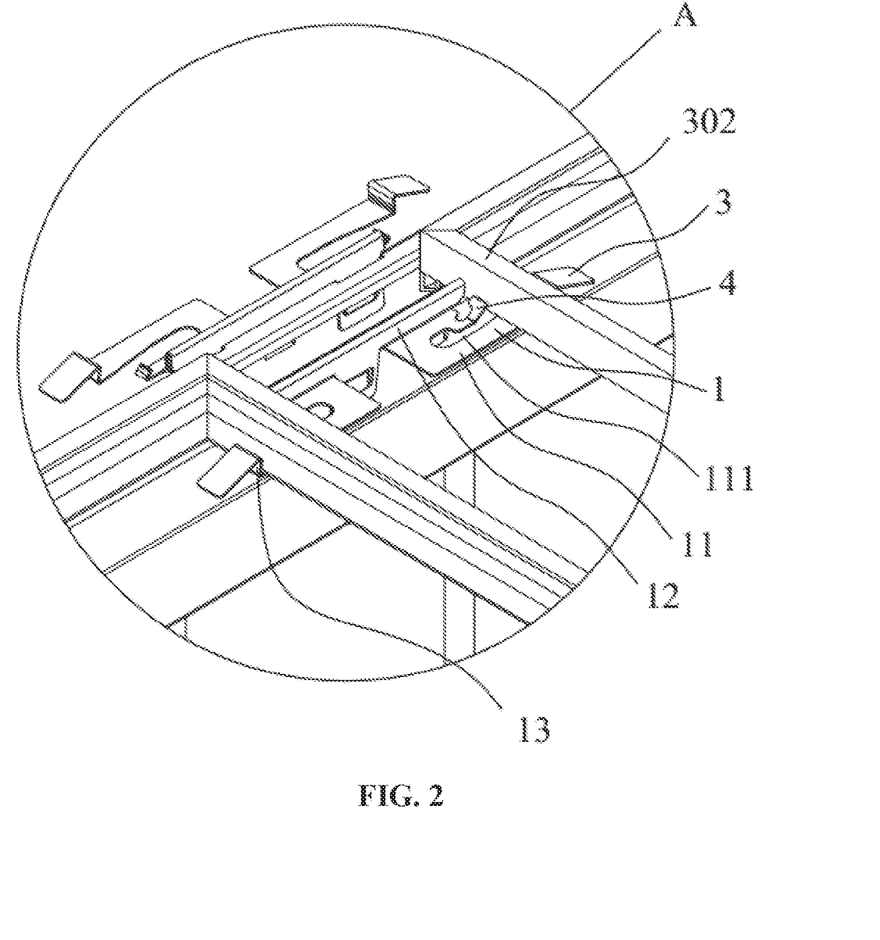
FIG. 2 is a partially enlarged view at a part A of FIG. 1.

As shown in FIGS. 1 and 2, this embodiment further provides a photovoltaic mounting structure. The photovoltaic mounting structure includes a locking device 20 and a guide rail 10, the locking device 20 is mounted on the guide rail 10, and the frame 30 of the photovoltaic module is configured to slide on the guide rail 10 along a length direction of the guide rail 10 until the frame 30 is fit-mounted on the locking device 20.

The locking device 20 of this embodiment has a simple structure and is slidably mounted on the frame 30 so that it is convenient for mounting and a large number of fasteners such as bolts and nuts or high-cost mounting clips and corresponding mounting tools thereof are not required.

In this manner, the installation labor and the installation cost of the photovoltaic module are reduced, and the installation efficiency and the installation quality of the photovoltaic system are improved. Since the bolts or the mounting clips are not required, the stress concentration of the frame 30 and the guide rail 10 is reduced, and the structural strength of the photovoltaic system is improved.

Figure 3:
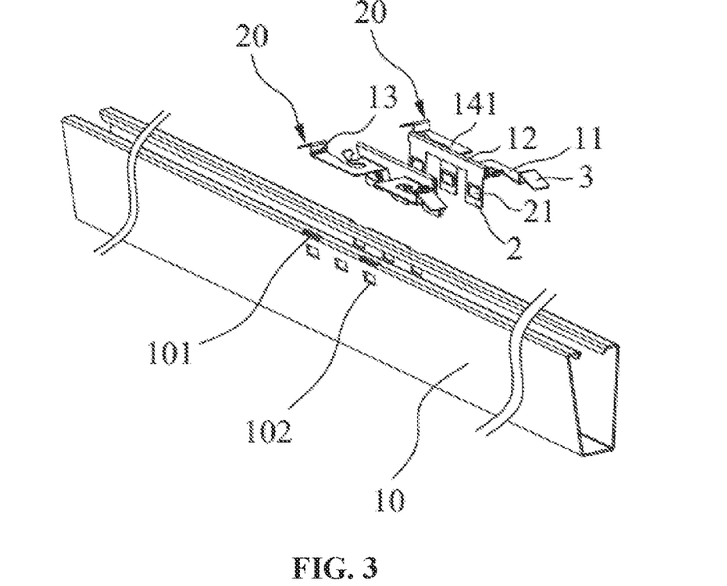
FIG. 3 is a schematic assembly view of a guide rail and a locking device according to embodiment one of present disclosure.
Figure 4:
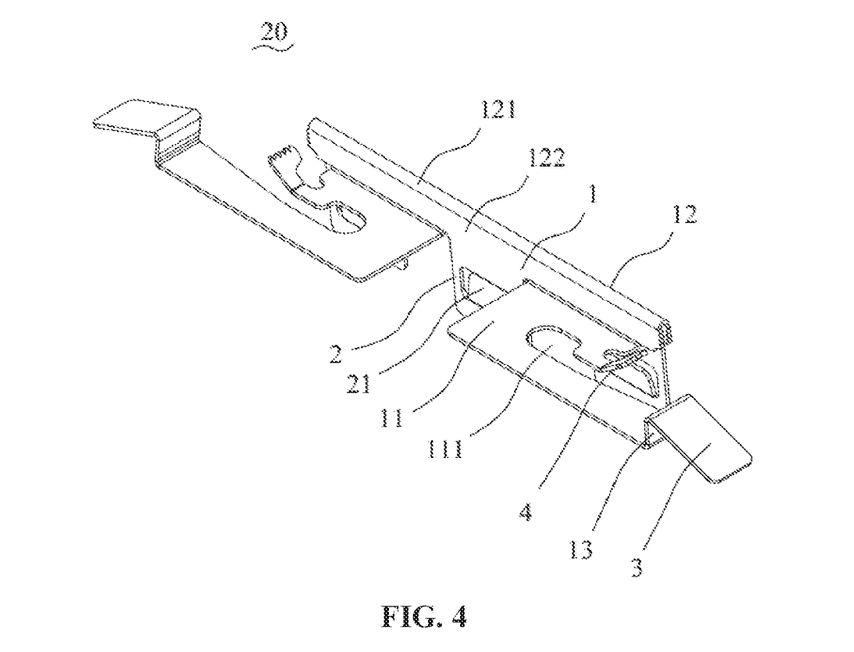
FIG. 4 is a structural view of a locking device from a first perspective according to embodiment one of the present disclosure.

As shown in FIGS. 3 and 4, this embodiment further provides a locking device 20, and the locking device 20 includes a blocking portion 1, a plug portion 2, and a guide portion 3. The blocking portion 1 protrudes from the guide rail 10 and is provided with a clamping groove for clamping the frame 30 of the solar module. The plug portion 2 is connected to the blocking portion 1, and the plug portion 2 is configured to be in plug-in fit with the guide rail 10. The guide portion 3 is connected to the blocking portion 1 and provided with a guide ramp, one end of the guide ramp is flush with a notch of the clamping groove, and the other end of the guide ramp extends obliquely downward along the length direction of the guide rail 10.

A installation process of the locking device 20 and the frame 30 is described below. The locking device 20 is fixed to the guide rail 10 through the plug portion 2, the frame 30 of the photovoltaic module slides along the length direction of the guide rail 10 and is slidably fitted into the clamping groove of the blocking portion 1 through the guide portion 3 of the locking device 20 so that the fixed installation of the frame 30 and the guide rail 10 is implemented by the clamping groove.

As shown in FIGS. 3 and 4, the blocking portion 1 includes a bearing plate 11, a first limiting portion 12 and a second limiting portion 13. The bearing plate 11 is configured to support the frame 30. The first limiting portion 12 and the second limiting portion 13 are both disposed on the bearing plate 11 and disposed at intervals along the length direction of the guide rail 10, the clamping groove is formed between the first limiting portion 12 and the second limiting portion 13, and the guide portion 3 is connected to the second limiting portion 13.

The first limiting portion 12 in this embodiment is U-shaped and includes a top plate 121 and two side plates 122 which are respectively connected to the top plate 121 and disposed opposite to each other, one of the two side plates 122 is connected to the bearing plate 11, and at least one of the two side plates 122 is provided with the plug portion 2.

It is to be noted that the blocking portion 1 has two opposite clamping grooves in the length direction of the guide rail 10, and the two clamping grooves can respectively clamp two frames 30 which slide in opposite directions on the guide rail 10 so that a same one locking device 20 can clamp two frames 30 at the same time, thus simplifying the structure of the locking device 20, and improving the clamping efficiency of the locking device 20.

Two ends of the locking portion 1 are provided with two opposite bearing plates 11 along the length direction of the guide rail 10. The bearing plate 11 extends along the length direction of the guide rail 10, and a portion of the bearing plate 11 beyond the first limiting portion 12 forms a bottom wall of a corresponding clamping groove to support the second frame body 302. Two end portions of the first limiting portion 12 in the length direction of the guide rail 10 are each formed with a groove wall of a corresponding clamping groove, two second limiting portions 13 are each formed with another groove wall of the corresponding clamping groove, and the two groove walls jointly clamp the second frame body 302 that slides into the clamping groove. Since structures of the two clamping grooves are the same, the structure of only one of the clamping grooves is described below for ease of understanding.

Figure 5:
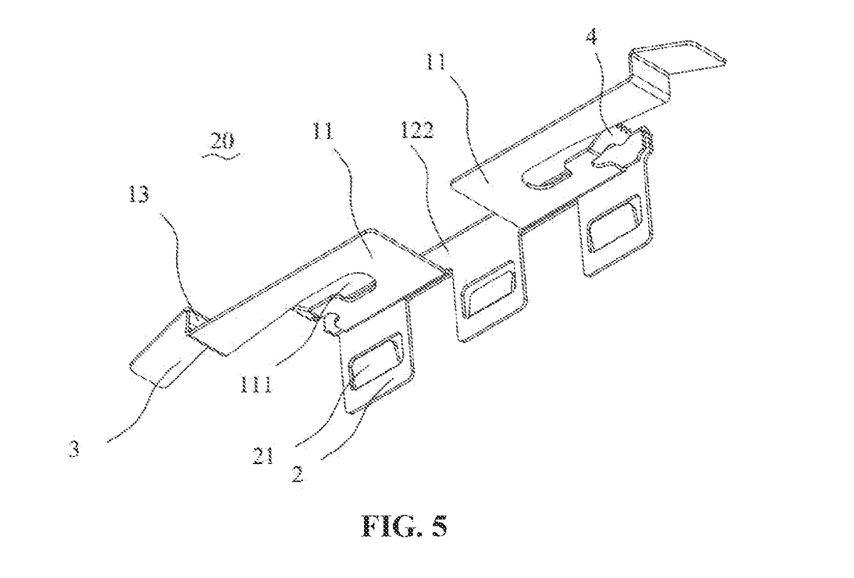
FIG. 5 is a structural view of a locking device from a second perspective according to embodiment one of the present disclosure.

As shown in FIGS. 4 and 5, the first limiting portion 12 is integrally formed by bending of a sheet metal, and the top plate 121 is connected to the two side plates 122 to form a U-shaped structure. The bearing plate 11 and the plug portion 2 are provided to extend on one of the two side plates 122, and only the plug portion 2 is provided to extend on the other side plate 122.

The bearing plate 11 is horizontally disposed and vertically connected to a corresponding side plate 122. The horizontally disposed bearing plate 11 is advantageous to increasing the contact area between the clamping groove and the second frame body 302, thus improving the mounting stability of the frame 30 and the locking device 20.

In an exemplary embodiment, the two side plates 122 are each provided with a plug portion 2, and in response to the plug portion 2 disposed on one of the two side plates 122 being in plug-in fit with the guide rail 10, the plug portion 2 disposed on the other one of the two side plates 122 abuts against the guide rail 10.

One side plate 122 of the first limiting portion 12 in this embodiment is provided with two bearing plates 11 and one plug portion 2, the two opposite bearing plates 11 are disposed at intervals along the length direction of the guide rail 10, and the plug portion 2 is disposed between the two bearing plates 11. The other side plate 122 is provided with two plug portions 2, and the two plug portions 2 are disposed at intervals along the length direction of the guide rail 10.

As shown in FIGS. 4 and 5, the plug portions 2 disposed on the two side plates 122 are staggered along a width direction of the guide rail 10, which is conducive to improving the strength and stability of plug-in fit between the plug portion and the guide rail.

The plug portion 2 of this embodiment is an inserting plate, and the guide rail 10 is provided with a mounting hole 101 mated with the inserting plate.

Specifically, the inserting plate is a rectangular plate, the guide rail 10 is integrally formed by using a metal plate, and a longitudinal section of the guide rail 10 is substantially V-shaped. A portion of an upper end face of the guide rail 10 close to a side wall is provided with the mounting hole 101 so that the inserting plate abuts against an inner surface of the side wall after being inserted into the mounting hole 101, thus improving the stability of insertion.

A specific assembly relationship between the locking device 20 and the guide rail 10 is described below. When two inserting plates on the same side plate 122 are respectively inserted into corresponding mounting holes 101 disposed on the guide rail 10, the two inserting plates abut against the inner surface of the side wall of the guide rail 10, and the inserting plate on the other side plate 122 abuts against an outer surface of the side wall of the guide rail 10. The three inserting plates on the two side plates 122 are staggered and jointly form a clamping body for clamping the side wall of the guide rail 10. In this manner, while the inserting plates are in plug-in fit with the guide rail 10, the clamping body formed by the inserting plates can clamp the side wall of the guide rail 10, thus further enhancing the stability for mounting the locking device 20 and the guide rail 10, and facilitating the improvement of the structural strength of the photovoltaic system.

Of course, the number of inserting plates may also be adjusted according to a specific length of the locking device 20. For example, the side plate 122 connected to the bearing plate 11 is provided with two inserting plates disposed at intervals, the other side plate 122 is provided with three inserting plates disposed at intervals, and the number of mounting holes 101 on the guide rail 10 is adaptively adjusted.

In an exemplary embodiment, the inserting plate is provided with an elastic piece 21, the guide rail 10 is provided with a fixing hole 102 mated with the elastic piece 21, and in response to the inserting plate being inserted into a corresponding mounting hole 101, the elastic piece 21 is snapped into a corresponding fixing hole 102.

The inserting plate has the elastic piece 21 which inclines toward the side wall of the guide rail 10, and the side wall of the guide rail 10 is provided with the fixing hole 102. When the inserting plate is inserted into the mounting hole 101, the elastic piece 21 is snapped into a corresponding fixing hole 102.

The elastic piece 21 in this embodiment is formed by punching of the inserting plate, which is conducive to simplifying the structure of the inserting plate and reducing the processing cost. The elastic piece 21 protrudes from the inserting plate and faces a side surface of the side wall of the guide rail 10 so as to be inserted into a corresponding fixing hole 102. Moreover, an inclination direction of an elastic piece 21 on the inserting plate abutting against the inner surface of the side wall of the guide rail 10 is opposite to an inclination direction of an elastic piece 21 on the inserting plate abutting against the outer surface of the side wall of the guide rail 10.

The first limiting portion 12 and the second limiting portion 13 are disposed at intervals along the width direction of the guide rail 10. In this manner, it is conducive to improving the clamping strength of the clamping groove on the second frame body 302, thus avoiding the deflection of the second frame body 302 in the clamping groove. A side of the bearing plate 11 in the width direction of the guide rail 10 is vertically connected to one side plate 122, and a side of the bearing plate 11 in the length direction of the guide rail 10 exceeds a corresponding end portion of the first limiting portion 12 and is connected to the second limiting portion 13.

The second limiting portion 13 in this embodiment is a rectangular plate, and the second limiting portion 13 is vertically disposed and protrudes from the guide rail 10 so as to be able to clamp, together with the first limiting portion 12, the second frame body 302 sliding into the clamping groove.

The guide portion 3 is a rectangular plate, one end of the guide portion 3 is connected to the top of the second limiting portion 13, and a height of the other end of the guide portion 3 is equal to or less than a height of the guide rail 10. An upper end surface of the guide portion 3 is a guide ramp so as to capture the frame 30 sliding on the guide rail 10 and avoid interference between the second limiting portion 13 and the frame 30. The guide portion 3 extends obliquely downward along the length direction of the guide rail 10, and when the frame 30 slides along the guide rail 10, the frame 30 can be captured by the guide portion 3 and slidably turned into the clamping groove along the guide ramp on the guide portion 3.

A specific process in which the frame 30 is captured by the guide portion 3 is described below. When the locking device 20 is mounted on the guide rail 10, the frame 30 slides on the guide rail 10 along the length direction of the guide rail 10, and when the second frame body 302 of the frame 30 slides to the guide portion 3, the frame 30 can slide along the guide ramp until the frame 30 is fitted in an accommodating cavity. In this case, the bearing plate 11 supports the bottom of the second frame body 302, and the first limiting portion 12 and the second limiting portion 13 jointly clamp the second frame body 302 so that the fixed installation of the frame 30 and the guide rail 10 is implemented.

It is to be noted that the locking device 20 in this embodiment is made of high-elasticity steel so as to ensure that the bearing plate 11 and the second limiting portion 13 have good elasticity. When the second frame body 302 of the frame 30 slides on the guide portion 3, the bearing plate 11, the second limiting portion 13 and the guide portion 3 are bent downward under the action of the gravity of the frame 30 to lower the height of the second limiting portion 13 so that the second frame body 302 of the frame 30 can be quickly fitted into the clamping groove. After the second frame body 302 is fitted into the clamping groove, the bearing plate 11, the second limiting portion 13 and the guide portion 3 are reset.

The bearing plate 11 is provided with a separation channel 111 extending along the length direction of the guide rail 10 and penetrating through an end face of the bearing plate 11 facing toward the second limiting portion 13, and the separation channel 111 is disposed between the first limiting portion 12 and the second limiting portion 13.

The bearing plate 11 is provided with the separation channel 111 such that the bearing plate 11 is connected to the second limiting portion 13 to form a structure similar to a cantilever beam. In this manner, the elasticity of the second limiting portion 13 is enhanced, and thus the bending range of the second limiting portion 13 in the vertical direction is further improved, thereby facilitating the rapid installation of the frame 30 and the guide rail 10. At the same time, the separation channel 111 reduces the weight of the bearing plate 11, thereby facilitating the lightweight of the locking device 20.

It is to be noted that a surface of the frame 30 is provided with a protective layer, and the protective layer may be an anti-oxidation layer, which is conducive to prolonging the service life of the frame 30 in harsh environments.

The locking device 20 further includes a piercing portion 4, the piercing portion 4 is connected to the blocking portion 1, and the piercing portion 4 is configured to pierce the protective layer of the frame 30 and abut against the frame 30 in response to the frame 30 being slidably fitted into the clamping groove.

The piercing portion 4 can pierce the protective layer of the frame 30 and abuts against the frame 30 so that the frame 30 can be reliably grounded through the locking device 20, the guide rail 10 and the bracket 40, thereby improving the safety of the photovoltaic system in use.

As shown in FIGS. 4 and 5, the piercing portion 4 includes an inclined plate, the inclined plate is disposed on the bearing plate 11 and disposed obliquely from bottom to top along the length direction of the guide rail 10, a top end of the inclined plate is provided with a sharp protrusion, and the sharp protrusion abuts against the frame 30.

The piercing portion 4 in this embodiment is formed at an inner wall of the separation channel 111 and has a compact structure, thereby reducing a volume of the locking device 20. At the same time, an end portion of the piercing portion 4 is widened so that the number of sharp protrusions is increased and the contact area between the piercing portion 4 and the second frame body 302 is increased, thereby facilitating reliable grounding of the frame 30.

A plurality of sharp protrusions are provided and form a zigzag structure, which is convenient to quickly pierce the protective layer of the frame 30. The inclined plate in this embodiment can pierce the protective layer of an inner side wall of the second frame body 302 and abuts against the pierced portion of the inner side wall of the second frame body 302.

In an exemplary embodiment, at least one of the first limiting portion 12 or the second limiting portion 13 is provided with a sharp protrusion. In order to achieve a reliable grounding of the frame 30, at least one of an end portion of the first limiting portion 12 constituting the clamping groove in the length direction of the guide rail 10 or the inner wall of the second limiting portion 13 is provided with sharp protrusions, and both the clamping groove and the piercing portion 4 can pierce the protective layer of the second frame body 302 so that the clamping groove has an auxiliary grounding function, and the ineffective grounding of the frame 30 due to failure of piercing the protective layer of the second frame body 302 by the piercing portion 4 can be avoided.

Embodiment Two

Figure 6:
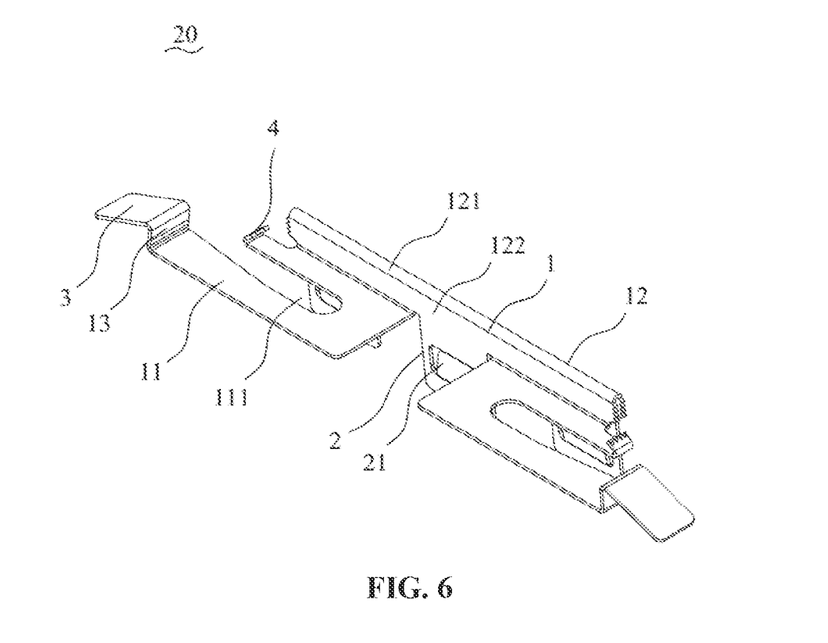
FIG. 6 is a structural view of a locking device according to embodiment two of the present disclosure.

As shown in FIG. 6, this embodiment provides a photovoltaic system which differs from the embodiment one in that the structure and the piercing position of the piercing portion 4 of the locking device 20 are different.

The piercing portion 4 in this embodiment and the second limiting portion 13 are disposed at two sides of the separation channel 111, respectively. The piercing portion 4 is formed at an end portion of the bearing plate 11 facing toward a corresponding second limiting portion 13. The piercing portion 4 extends along the direction of the guide rail 10 and is bent at the end toward the first limiting portion 12 to form the inclined plate.

The inclined plate is inclined toward a corresponding first limiting portion 12, an end portion of the inclined plate also has sharp protrusions, and the sharp protrusions and the sharp protrusions in embodiment one have a same structure of a zigzag structure. The sharp protrusions can pierce the protective layer of the second frame body 302 and abuts against the pierced portion of the second frame body 302 when the second frame body 302 of the frame 30 is fitted into the clamping groove so that the frame 30 is reliably grounded.

It is to be noted that the piercing portion 4 in this embodiment can pierce the protective layer of an outer side wall of the second frame body 302 and abuts against the pierced portion of the outer side wall of the second frame body 302.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A locking device for fixing a photovoltaic module to a guide rail, the locking device comprising:
   a blocking portion protruding from the guide rail, wherein the blocking portion is provided with a clamping groove for clamping a frame of the solar module;
   a plug portion connected to the blocking portion, wherein the plug portion is configured to be in plug-in fit with the guide rail; and
   a guide portion connected to the blocking portion, wherein the guide portion is provided with a guide ramp, one end of the guide ramp is flush with a notch of the clamping groove, and the other end of the guide ramp extends obliquely downward along a length direction of the guide rail.

2. The locking device of claim 1, wherein the blocking portion comprises:
   a bearing plate configured to support the frame; and
   a first limiting portion and a second limiting portion, wherein the first limiting portion and the second limiting portion are both disposed on the bearing plate and disposed at intervals along the length direction of the guide rail, the clamping groove is formed between the first limiting portion and the second limiting portion, and the guide portion is connected to the second limiting portion.

3. The locking device of claim 2, wherein the first limiting portion and the second limiting portion are disposed at intervals along a width direction of the guide rail.

4. The locking device of claim 2, wherein the first limiting portion is U-shaped and comprises a top plate and two side plates which are respectively connected to the top plate and disposed opposite to each other, one of the two side plates is connected to the bearing plate, and at least one of the two side plates is provided with the plug portion.

5. The locking device of claim 4, wherein a plurality of plug portions are disposed on the two side plates, and in response to a plug portion of the plurality of plug portions disposed on one of the two side plates being in plug-in fit with the guide rail, a plug portion of the plurality of plug portions disposed on the other one of the two side plates abuts against the guide rail.

6. The locking device of claim 5, wherein the plurality of plug portions disposed on the two side plates are staggered along a width direction of the guide rail.

7. The locking device of claim 1, wherein the plug portion is an inserting plate, and the guide rail is provided with a mounting hole mated with the inserting plate.

8. The locking device of claim 7, wherein the inserting plate is provided with an elastic piece, the guide rail is provided with a fixing hole mated with the elastic piece, and in response to the inserting plate being inserted into the mounting hole, the elastic piece is snapped into the fixing hole.

9. The locking device of claim 2, wherein the bearing plate is provided with a separation channel extending along the length direction of the guide rail and penetrating through an end face of the bearing plate facing toward the second limiting portion, and the separation channel is disposed between the first limiting portion and the second limiting portion.

10. The locking device of claim 2, further comprising a piercing portion, wherein the piercing portion is connected to the blocking portion, and the piercing portion is configured to pierce a protective layer of the frame and abut against the frame in response to the frame being slidably fitted into the clamping groove.

11. The locking device of claim 10, wherein the piercing portion comprises an inclined plate, the inclined plate is disposed on the bearing plate and disposed obliquely from bottom to top along the length direction of the guide rail, a top end of the inclined plate is provided with a sharp protrusion, and the sharp protrusion abuts against the frame.

12. The locking device of claim 10, wherein at least one of the first limiting portion or the second limiting portion is provided with a sharp protrusion.

13. A photovoltaic module mounting structure, comprising a guide rail and a locking device for fixing a photovoltaic module to the guide rail, wherein the locking device comprises:
   a blocking portion protruding from the guide rail, wherein the blocking portion is provided with a clamping groove for clamping a frame of the solar module;
   a plug portion connected to the blocking portion, wherein the plug portion is configured to be in plug-in fit with the guide rail; and
   a guide portion connected to the blocking portion, wherein the guide portion is provided with a guide ramp, one end of the guide ramp is flush with a notch of the clamping groove, and the other end of the guide ramp extends obliquely downward along a length direction of the guide rail.

14. A photovoltaic system, comprising a solar module, and further comprising the photovoltaic module mounting structure of claim 13.

15. The photovoltaic module mounting structure of claim 13, wherein the blocking portion comprises:
   a bearing plate configured to support the frame; and
   a first limiting portion and a second limiting portion, wherein the first limiting portion and the second limiting portion are both disposed on the bearing plate and disposed at intervals along the length direction of the guide rail, the clamping groove is formed between the first limiting portion and the second limiting portion, and the guide portion is connected to the second limiting portion.

16. The locking device of claim 15, wherein the first limiting portion and the second limiting portion are disposed at intervals along a width direction of the guide rail.

17. The locking device of claim 15, wherein the first limiting portion is U-shaped and comprises a top plate and two side plates which are respectively connected to the top plate and disposed opposite to each other, one of the two side plates is connected to the bearing plate, and at least one of the two side plates is provided with the plug portion.

18. The locking device of claim 17, wherein a plurality of plug portions are disposed on the two side plates, and in response to a plug portion of the plurality of plug portions disposed on one of the two side plates being in plug-in fit with the guide rail, a plug portion of the plurality of plug portions disposed on the other one of the two side plates abuts against the guide rail.

19. The locking device of claim 18, wherein the plurality of plug portions disposed on the two side plates are staggered along a width direction of the guide rail.

20. The locking device of claim 13, wherein the plug portion is an inserting plate, and the guide rail is provided with a mounting hole mated with the inserting plate.

* * * * *